(12) United States Patent
Sawyer, Jr.

(10) Patent No.: US 9,775,289 B2
(45) Date of Patent: Oct. 3, 2017

(54) COLLAPSIBLE GRASS EJECTION CHUTE FOR A ROTARY LAWNMOWER

(71) Applicant: Thomas Kidder Sawyer, Jr., Martinsville, MO (US)

(72) Inventor: Thomas Kidder Sawyer, Jr., Martinsville, MO (US)

( * ) Notice: Subject to any disclaimer, the term of this patent is extended or adjusted under 35 U.S.C. 154(b) by 56 days.

(21) Appl. No.: 14/756,598

(22) Filed: Sep. 23, 2015

(65) Prior Publication Data

US 2017/0079205 A1 Mar. 23, 2017

(51) Int. Cl.
*A01D 67/00* (2006.01)
*A01D 34/71* (2006.01)

(52) U.S. Cl.
CPC .................... *A01D 34/71* (2013.01)

(58) Field of Classification Search
CPC .... A01D 34/71; A01D 34/63; A01D 2101/00; A01D 42/005
See application file for complete search history.

(56) References Cited

U.S. PATENT DOCUMENTS

| | | | | |
|---|---|---|---|---|
| 2,756,556 A * | 7/1956 | Watkins | ................. | A01D 34/71 56/189 |
| 3,150,479 A * | 9/1964 | Ewald | .................... | A01D 34/71 56/13.4 |
| 3,413,783 A * | 12/1968 | Gordon | ................. | A01D 34/63 56/320.2 |
| 3,420,041 A * | 1/1969 | Irgens | .................... | A01D 34/71 56/320.2 |
| 3,706,190 A * | 12/1972 | Taub | ..................... | A01D 34/71 56/13.4 |
| 3,726,069 A * | 4/1973 | Cope | ..................... | A01D 34/71 56/202 |
| 3,760,572 A * | 9/1973 | Marion | .................. | A01D 34/63 56/320.2 |
| 3,797,214 A * | 3/1974 | Erdman | ................. | A01D 34/71 56/202 |
| 3,925,972 A * | 12/1975 | Andersson | ............ | A01D 34/71 56/202 |
| 4,041,682 A * | 8/1977 | Kidd | ..................... | A01D 34/71 56/320.2 |
| 4,226,074 A * | 10/1980 | Mullet | ................... | A01D 34/71 56/13.6 |
| 4,258,539 A * | 3/1981 | Pearce | ............... | A01D 43/0631 56/202 |
| 4,726,178 A * | 2/1988 | Mallaney | ............... | A01D 34/82 56/202 |
| 5,003,757 A * | 4/1991 | Hill | ........................ | A01D 34/71 56/17.4 |

(Continued)

*Primary Examiner* — Thomas B Will
*Assistant Examiner* — Joan D Misa

(57) ABSTRACT

A rotary blade lawnmower grass ejection chute device having a capability of folding up from a fully open and operating position to a partially closed or a fully closed position when the leading edge comes in contact with a fixed object. This grass ejection chute device then has the capability of re-opening up to a full operating position when the lawnmower has cleared the fixed object. This grass ejection chute device also has the capability of being fully closed and in a locked position blocking cut grass from being ejected through the lawnmower deck ejection port to allow a mulching process of cut grass clippings to take place.

2 Claims, 2 Drawing Sheets

(56) References Cited

U.S. PATENT DOCUMENTS

| | | | | |
|---|---|---|---|---|
| 5,195,311 | A * | 3/1993 | Holland | A01D 34/71 56/202 |
| 5,442,902 | A * | 8/1995 | Mosley | A01D 42/005 56/17.5 |
| 5,499,494 | A * | 3/1996 | Boshell | A01D 34/71 56/320.1 |
| 5,884,463 | A * | 3/1999 | Darzinskis | A01D 34/001 56/13.4 |
| 5,992,135 | A * | 11/1999 | Benway | A01D 34/71 56/200 |
| 6,971,224 | B1 * | 12/2005 | Hancock | A01D 34/71 56/255 |
| 6,990,793 | B2 * | 1/2006 | Osborne | A01D 42/005 56/320.1 |
| 7,051,504 | B2 * | 5/2006 | Osborne | A01D 43/0631 56/320.2 |
| 7,082,742 | B2 * | 8/2006 | Schrattenecker | A01D 41/148 56/208 |
| 8,104,255 | B1 * | 1/2012 | Hurst | A01D 34/71 56/220 |

* cited by examiner

COLLAPSIBLE GRASS EJECTION CHUTE FOR A ROTARY LAWNMOWER

BACKGROUND OF THE INVENTION

The first gas engine driven lawnmowers did not have a means of ejecting cut grass clippings. The lawnmower deck was a little higher off the grass being cut and the grass clippings would be forced out by the action of the lawnmower blade. This worked to an extent when the grass clippings were dry. However when the grass being cut was damp or very tall the grass clippings would pile up under the lawnmower deck and strain the lawnmower engine to a point it would shut down.

The idea to resolve this issue was to cut an opening in the lawnmower deck to facilitate the ejection of the lawnmower grass clippings from under the lawnmower deck. This worked, however there was no control of where the cut grass clippings would end up. This facilitated the invention of a cut grass ejection chute placed in alignment with the opening cut into the lawnmower deck. This has been the standard for years. This idea was also augmented so the ejection chute could be removed and a device could be placed over the opening in the lawnmower deck to block the cut grass clippings from being ejected. Thus the grass clippings would be cut several times or as it is called, mulched. These finer pieces of cut grass clippings would then work their way from under the lawnmower deck from the force generated from the rotating lawnmower blade.

The drawback with a fixed and rigid lawnmower grass ejection chute is that it gets in the way when mowing next to a fixed object, such as a tree, post or other fixed object. Some people compensate this by drilling a hole in the end of the chute and attaching a wire or rope to the chute so it can be pulled up and out of the way to clear the fixed object so the grass can be completely mowed. This poses a very grave safety hazard for the lawnmower operator as the grass clippings are not directed to the side and rear away from the lawnmower and may hit the fixed object and bounce back on the operator.

A solution is to have a lawnmower grass cutting chute that will fold up to a partial closing, or even to a full closing when the chute comes in contact with a fixed object and then open back up when the lawnmower has cleared the fixed object while directing cut grass clipping away from the fixed object and the lawnmower operator the entire time. This allows the lawnmower deck with the cutting blade to cut much closer to the fixed object in order to cut the grass surrounding the fixed object.

The present invention is designed to fold up and re-open when it comes in contact with a fixed object. This invention is also designed to prevent the grass clippings from bouncing back on the operator by closing off the lawnmower deck ejection port opening temporary.

This present invention also allows the lawnmower grass ejection chute to be latched in the closed position to prevent cut grass clippings from exiting the lawnmower deck ejection port for a grass mulching operation when so desired.

SUMMARY OF THE INVENTION

This present invention of a lawnmower grass ejection chute device for a rotary blade lawnmower is designed to allow the operator of a lawnmower grass cutting device to cut grass closer to a fixed object such as a fence post, tree trunk or other impediments.

This lawnmower grass ejection chute device has the capability of mounting on a typical walk behind rotary blade lawnmower deck, a self-propelled rotary blade lawnmower deck, a rotary blade lawnmower deck that is mounted on the underside of a riding type lawn mower or even a wheeled lawnmower deck that is pulled behind a motorized device such as an ATV or any type rotary blade lawnmower deck where cut grass clippings are directed away from the lawnmower device.

This grass ejection chute device has the capability of folding up from a fully open position, to a partially closed position or even a fully closed position when the grass ejection chute device comes in contact with a fixed object; while still having the capability of directing cut grass clippings away from the fixed object as well as the operator of the lawnmower device.

The advantage of having a lawnmower grass ejection chute have this capability is it allows the lawnmower operator to safely cut grass closer to a fixed object and also eliminates the possibility of a fixed lawnmower grass ejection chute damaging a tree trunk or other fixed objects.

This grass ejection chute device has the capability of blocking off the ejection of cut grass clippings through the lawnmower deck ejection port in order to perform a mulching operation by means of the front guard/grass deflector being latched in the closed position.

BRIEF DESCRIPTION OF THE DRAWINGS

The attached drawings included in this presentation are to help further describe the embodiment of this invention. It is hoped the drawings will illustrate the heart of the invention and even go a step further in addressing the advantages of having a lawnmower grass ejection chute having a capability of folding up when it comes in contact with a fixed object or when it is stored in the fully closed position may be used for a grass mulching operation.

DETAILED DESCRIPTION OF THE PREFERRED EMBODIMENTS

Figure 1:
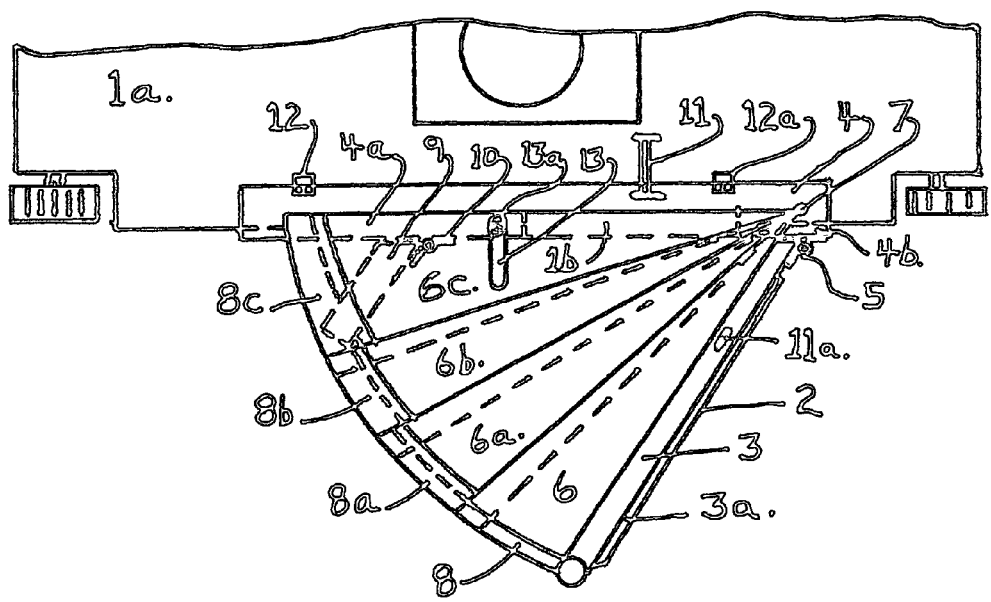
FIG. 1 illustrates a top view of the Tommy Grass Ejection Chute in the fully open position mounted on a typical rotary blade walk behind lawnmower deck.

The following detailed description is not limited or intended to be limited to the following preferred embodiment description or illustration. Although every effort has been made to describe the particular embodiments, one skilled in the art may recognize certain changes that can be made in design or shape that may still be in the scope and spirit of the invention as declared in the claims for this invention.

The embodiments listed are intended to be illustrative and should not be deemed limited in their scope. The embodiments are not and should not be deemed to be totally exclusive in their depiction, furthermore, the components that make up this present invention can be used in various combinations and relationships to one another.

Manufacture of the Tommy Grass Ejection Chute can be accomplished by using high impact plastics or resins using an ejection-mold process. It is also possible to manufacture the Tommy Grass Ejection Chute from metal stamping and fabrication. All of the components used in making this device should be weather proof and extremely sturdy for use in all types of outdoor elements and conditions.

Please note, in respect to the attached description, it is noted that the size, shape and dimensional relationship between the various components of this invention can vary. Also, consideration for the types of material in the construction of the various components can vary and all equivalent relationships as illustrated in the drawings and described in the text are intended to encompass the embodiment of this invention.

Please note, that one skilled in the art may recognize possible modifications of the various components and embodiments of this present invention, however, the scope and spirit of this present invention is defined in the claims of this present invention.

FIG. 1 refers to an overall top view of the Tommy Grass Ejection Chute referenced as 2 in a fully open position mounted on a typical walk behind rotary blade lawnmower grass cutting deck exhibited as 1a. This present invention can be mounted on a walk behind push type or self-propelled rotary blade type lawnmower grass cutting lawnmower deck. This present invention can also be mounted on a rotary blade lawn mower deck that is mounted on the underside of a riding type lawn mower or a wheeled lawnmower grass rotary blade cutting deck that is pulled behind a motorized device such as an ATV. The complete Tommy Grass Ejection Chute is referenced as 2. The base plate 4 is made in one piece and attaches to the top of a rotary blade lawnmower grass cutting deck by means of two hinges referenced as 12 and 12a. There are two profiles referenced as 4a and 4b molded as part of the base plate 4 that extend downward 90 degrees from the base plate 4 mounted on the top portion of the lawnmower deck 1a. These two profiles 4a and 4b are in the front and to the rear of the lawnmower deck grass ejection opening 1b. The backside of these two profiles 4a and 4b are molded to conform to the contours of the vertical portion of the lawnmower deck 1a and also provide a stable and flat front surface for the front mandrel and torsion spring 5 and the rear guard mandrel and torsion spring 10 to be mounted. These two profiles rest against the vertical portion of the lawnmower deck. The front guard/grass deflector 3 as well as the rub rail 3a mounted to the front guard/grass deflector 3 pivot on the front vertical profile of the base plate 4b by means of a mandrel and torsion spring 5 that is affixed to the front vertical profile 4b of the base plate 4. The front guard/grass deflector 3 with the rub rail 3a are kept in the open position from the force generated from the mandrel and torsion spring 5 mounted to the front vertical portion of the base plate 4b. The four leaves 6, 6a, 6b and 6c are of an elongated triangular shape having a somewhat pointed but slightly rounded end that are connected to the top of the base plate 4 by means of a pin referenced as 7 that allows the leaves 6, 6a, 6b and 6c to pivot from a fully open and partially overlapped position to a fully closed and overlapped position on top of the base plate 4 when in the fully stored position. The distal end of the four leaves 6, 6a, 6b and 6c having flared ends and overlap one another. The distal end of the flared leaves are held in place and rigid relative to each other by means of control guides referenced as 8, 8a, 8b and 8c molded into the top and distal end of each leaf 6, 6a, 6b and 6c. The control guides 8, 8a, 8b and 8c are designed to be hollow and slightly smaller than the adjacent control guide starting at the front guard/grass deflector 3 with control guide 8. Leaf 6 is connected to the top portion of the front guard/grass deflector 3. The control guides 8, 8a, 8b and 8c are partially started or inserted into the inner adjacent control guide. In the process of the lawnmower device moving forward and the rub rail 3a part of the front guard/grass deflector 3 encounters a fixed object the torsion spring 5 is overridden and the Tommy Grass Ejection Chute leaves 6, 6a, 6b and 6c start to retract or fold up by overlapping the adjacent fin controlled by the control guides 8, 8a, 8b and 8c moving toward the rear and to the partially closed or fully closed position, depending on how close the lawnmower device is to the fixed object. Referenced as 13, leaf 6c contains an elongated slot through it held in place to the top portion of base plate 4 by means of a pin 13a allowing leaf 6c to move with a back and forward motion depending on the force of the torsion spring 5. This allows fin 6c to control the limits of how much fins 6, 6a and 6b are able to open being pulled forward by the torsion spring 5 but also having the capability to fold completely up and overlapped in the stored position on top of base plate 4. The rear guard/grass deflector 9 is on the underside of leaf 6c, although not connected, and is mounted on the rear base plate 4a vertical profile that extends downward from base plate 4 mounted on the top of the lawnmower grass cutting deck and to the rear of the lawnmower deck grass ejection opening 1b by means of the mandrel and torsion spring 10. The mandrel and torsion spring 10 allows the rear guard/grass deflector 9 to have a pivoting motion and the mandrel and torsion spring 10 also controls the open and closed limits of rear guard/grass deflector 9. This action maintains the correct angle to direct the cut grass clippings to the side and rear of the ejection port 1b and away from the fixed object encountered. As the front rub rail 3a attached to the front guard/grass deflector 3 comes in contact with a fixed object and has overcome the tension of the torsion spring 5 diverts the grass clippings as they are being discharged away from hitting the fixed object and bouncing back on the lawnmower operator. The front guard/grass deflector 3 has the capability of partially or completely closing off the lawnmower deck grass ejection opening 1b until the front guard/grass deflector has cleared or passed the fixed object or can remain in any degree of a partial open position to deflect cut grass clippings. In this process of the front guard/grass deflector 3 moving to the rear, the front guard/grass deflector 3 will eventually come in contact with the rear guard/grass deflector 9 and overcome its tension generated by the rear tension spring 10 and force the rear guard to angle away from the grass ejection port 1b but still having the capability of deflecting cut grass clippings until it is in a complete rearward position. The front guard/grass deflector 3 may close off all grass clippings being ejected through the grass ejection port 1b of the lawnmower deck 1a or the two opposing front and rear guard/deflectors 3 and 9 will still offer a good path for the grass clippings to be forced away from the fixed object and away from the operator on their way to full closure. The front guard/grass deflector 3 also has the capability of being latched in the fully closed position and not allowing any cut grass clipping from exiting the lawnmower ejection port 1b by engaging the latch 11 with the catch referenced as 11a. This fully closed position can be used for mulching where the cut grass clippings stay under the lawnmower deck 1a to be cut several times by the lawnmower rotary blade into smaller pieces that work their way out from under the deck or where the cut grass clippings may be collected in a rear collection bag. This lacked position can also reduce space required for storing the lawnmower device where storage space is limited. The Tommy Grass Ejection Chute 2 can also be rotated 90 degrees upward in the open position by means of the two hinges 12 and 12*a*.

Figure 2:
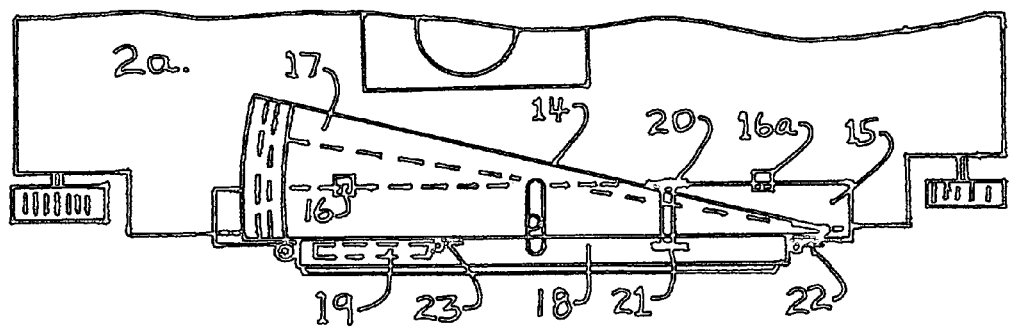
FIG. 2 illustrates a top view of the Tommy Grass Ejection Chute in the fully closed and latched position on a typical rotary blade walk behind lawnmower deck.

FIG. 2 refers to an overall top view of the Tommy Grass Ejection Chute referenced as 14 in a fully closed and latched position mounted on a typical walk behind rotary blade lawnmower grass cutting deck referenced as 2*a*. The base plate referenced as 15 is mounted on the top of a typical rotary blade lawnmower deck 2*a* by means of hinges 16 and 16*a*. The leaves referenced as 17 are temporarily stored in a stacked position on top of the base plate 15 having been forced into that position by the front guard/grass deflector 18. The rear guard/grass deflector 19 has also been forced to its temporary rear position by the front guard/grass deflector 18. The front guard/grass deflector 18 is held in the fully closed or latched position by the latch 20 engaged in the catch 21. The front torsion spring referenced as 22 and the rear torsion spring 23 are shown in their fully extended position. This fully closed and latched position is used for mulching grass or for storing the lawnmower device requiring less space.

Figure 3:
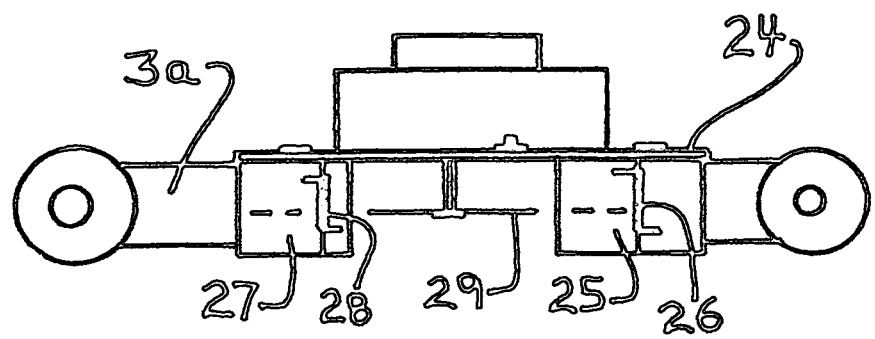
FIG. 3 illustrates a side view of the Tommy Grass Ejection Chute in the fully open position mounted on a typical rotary blade walk behind lawnmower deck.

FIG. 3 refers to a side view of the Tommy Grass Ejection Chute referenced as 24 in the fully open position mounted on a typical walk behind rotary blade lawnmower grass cutting deck exhibited as 3*a*. The front guard/grass deflector 25 is shown in the fully opened position held in place by the mandrel and torsion spring 26. The rear guard/grass deflector 27 is shown in a fully opened position held in place by the mandrel and torsion spring 28. Reference 29 refers to the lawnmower grass cutting blade.

Figure 4:
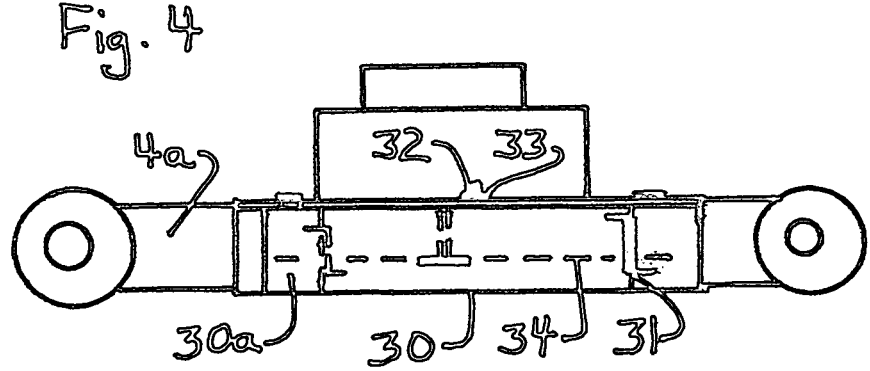
FIG. 4 illustrates a side view of the Tommy Grass Ejection Chute in the fully closed and latched position on a typical rotary blade walk behind lawnmower deck.

FIG. 4 refers to a side view of the Tommy Grass Ejection Chute referenced as 30 in the fully closed position mounted on a typical walk behind rotary blade lawnmower grass cutting deck exhibited as 4*a*. The front guard/grass deflector 30 is shown in the fully closed position. The front torsion spring 31 has been overcome from the pressure applied to the front guard/grass deflector 30 after coming in contact with a fixed object and pivoting to the rear or closed position while also forcing the rear guard/grass deflector 30*a* to a complete rearward position. The latch 32 has been engaged into the catch 33 to keep the Tommy Grass Ejection Chute front guard 30 in the closed and latched position. This closed position blocking the ejection of cut grass clippings can now be used for mulching cut grass clippings or for directing them into a rear grass collection bag. Reference 34 refers to the lawnmower grass cutting blade.

I claim:

1. A collapsible grass ejection chute assembly for a rotary lawnmower, the chute assembly comprising:
    a base plate;
    at least two hinge members which pivotally attach the base plate to a mower deck of the lawnmower above a grass discharge opening of the mower deck and therein allowing the chute assembly to pivot along a substantially longitudinal axis from a working position to an upward position;
    the base plate having first and second pins extending substantially perpendicular therefrom;
    at least three elongated triangular shaped nested members wherein at least one of the at least three elongated members contains a slot therein and one of the at least three elongated members has a grass deflector extending therefrom for deflecting grass clipping as they exit the discharge opening and for closing the discharge opening when the chute assembly is in a collapsed position,
    the at least three elongated members being attached to a top surface of the base plate by the first pin for pivotal movement about a single common axis as defined through the first pin between a first extended position defining the chute assembly and a second collapsed and substantially overlapped nested position defining the collapsed position,
    wherein during the pivotal movement between the first and second positions, the slot of the at least one of the at least three elongated members translates along the second pin and therein assisting in guiding the pivotal movement of the elongated members between the first and second positions; and,
    a torsion spring which biases the chute assembly in the first extended position.

2. The collapsible grass ejection chute assembly for a rotary lawnmower of claim 1 wherein the chute assembly further comprises a latch device for maintaining the chute assembly in the second collapsed and substantially overlapped nested position.

* * * * *